Dec. 13, 1949 W. ERNST 2,491,365
BALANCED GEAR PUMP
Filed June 19, 1944
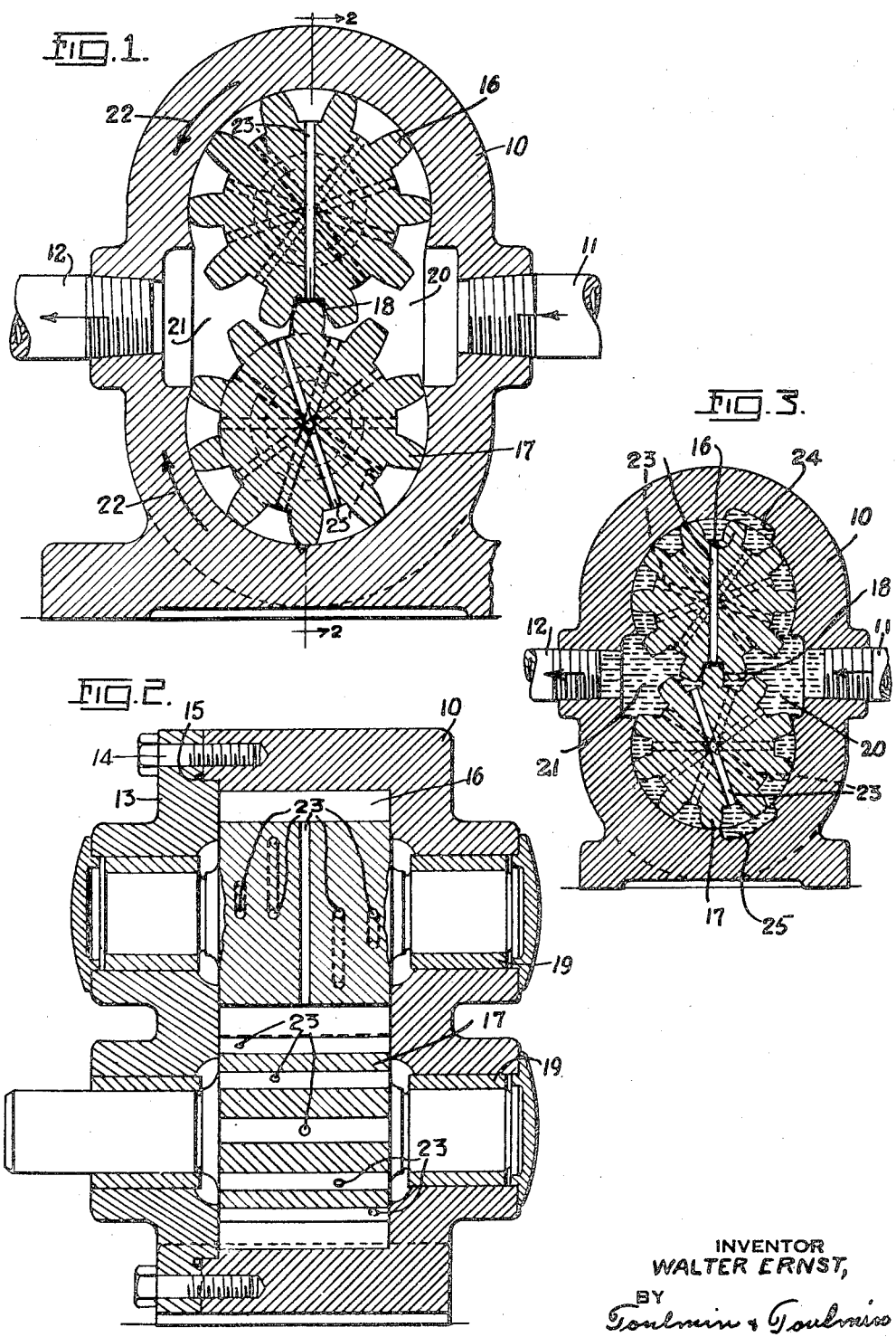
INVENTOR
*WALTER ERNST,*
BY
Toulmin & Toulmin
ATTORNEYS Patented Dec. 13, 1949

2,491,365

UNITED STATES PATENT OFFICE 2,491,365

BALANCED GEAR PUMP

Walter Ernst, Mount Gilead, Ohio, assignor to H-P-M Development Corporation, Wilmington, Del., a corporation of Delaware Application June 19, 1944, Serial No. 541,050

4 Claims. (Cl. 103—126)

This invention relates to hydraulic apparatus and, more particularly, to hydraulic pumps or motors.

This invention has for its principal object the balancing of gear pumps or motors. In the usual type of gear pump or motor the gears or rotating pumping members are subjected to considerable thrust due to the operating pressures within the device. This unbalanced thrust causes severe bearing loads, excessive wear and inefficient operation.

There is also present in gear pumps and motors another phenomenon which detracts from the performance thereof. As the gears rotate, in mesh, a certain amount of fluid is trapped in the space between consecutive teeth on one gear and beneath the tooth of the other gear disposed therebetween. The fluid so trapped is subjected to excessive pressure as the gears rotate and tends excessively to load the bearings and also to cause the device to be noisy in operation.

Accordingly, it is another object of this invention to provide a means for relieving the aforementioned entrapped fluid.

It is another object of this invention to provide a full hydraulically balanced gear pump or motor in connection with the relief of the fluid entrapped at the point of contact of the said gears.

It is another object to provide a simplified and improved method for balancing a gear pump or motor such that the resulting product is more economical to produce and operates in an improved manner.

These and other objects will become more apparent upon reference to the following description taken in connection with the accompanying drawings, in which:

Figure 1 is a section through a gear pump or motor constructed according to this invention;

Figure 2 is a transverse section through the pump of Figure 1 and is indicated by the line 2—2 on Figure 1; and Figure 3 is a view similar to Figure 1 but showing a somewhat modified construction.

Referring to the drawings and, particularly, Figures 1 and 2, there is illustrated a gear pump or motor having a casing 10 with the ports 11 and 12. The casing 10 may comprise a member open on one side and closed by a plate 13 which is fastened thereto by the screws 14. Suitable sealing means such as the resilient ring 15 may be used to effect a seal along the parting line of the members 13 and 10.

Rotatably mounted within the casing 10 are the gears 16 and 17 which are in mesh at 18. The gears are suitably journalled in the casing 10 and the plate 13 such as by the bearings 19 which are carried by the said casing and plate. The gears 16 and 17 are, preferably, integral with or firmly affixed to the shafts with which they rotate.

The gears form, with the casing 10 and plate 13, the chambers 20 and 21. If the device is to operate as a pump, the gears rotate in the direction of the arrows 22 in Figure 1 and continuously draw fluid into the chamber 20 from the port 11 while expelling fluid from the chamber 21 through the port 12.

Inasmuch as the chamber 21 is at discharge pressure while the chamber 20 is at suction pressure, the gears 16 and 17 are subjected to thrusts exerted thereon by the pressure fluid within the discharge chamber. For example, the thrust on the gear 16 extends toward the upper right from the chamber 21 while the thrust on the gear 17 extends from the said chamber toward the lower right (Figure 1).

In order to balance off the aforementioned thrusts there is provided a plurality of bores in the gears 16 and 17, these bores passing through the gears on diameters thereof and terminating at either end between pairs of teeth. The bores are indicated at 23 in Figures 1 and 2 and are arranged across the width of the gear so that each bore is separate from the others. It will be apparent that the gears 16 and 17 must each comprise an even number of teeth in order that the bores 23 may effect hydraulic communication between the opposite tooth spaces. However, although the gears are shown to be of the same size, it will be apparent that they may be of any relative size without in any way influencing the operation of this invention.

Referring now to Figure 3, there is shown a pump or motor constructed similarly to the device of Figures 1 and 2 except that the casing 10 is provided with the spaces or notches 24 and 25 which are provided for the purpose of relieving the fluid which is trapped at 18 as the gears rotate. The spaces 24 and 25 are located so that a tooth space approaching the zone 18 is in fluid communication therewith and continues in communication therewith until the entrapped fluid has been completely relieved.

*Operation of the embodiment of Figures 1 and 2*

Assume that the gears 16 and 17 are being rotated as indicated by the arrows 22. Then, the chamber 21 is at discharge pressure and tends to exert a thrust on the gears 16 and 17 away from the said discharge chamber. However, the bores 23 communicate the discharge pressure to the tooth spaces opposite the discharge chamber and an opposite and equal thrust is thereby exerted on the said gears. As the gears rotate and the tooth spaces thereon pass from the discharge chamber to the inlet chamber, the gears are maintained in full hydraulic balance by the interconnecting bores 23.

It will be evident that if the device of Figures 1 and 2 were to be operated as a motor, substantially equivalent conditions would prevail, the direction of rotation of the gears being reversed, but the pressure conditions being substantially identical. Likewise, it will be evident that the practice of this invention is not limited to gear pumps and motors employing any particular design of tooth but may be extended to any rotary device operating on the principle of displacing fluid by alternate spaces and projections on a pair of mating members.

Operation of the embodiment of Figure 3

Assume that the gears 16 and 17 are being rotated in the same direction as they are in Figure 3. The chamber 21 is the discharge chamber and the pressure therein tends to produce a thrust on the gears 16 and 17 which is balanced by the equal and opposite thrust on the said gears accomplished by the bores 23.

In addition to the balancing of the gears, the fluid entrapped in any of the tooth spaces on either of the gears by the tooth entering the said space is permitted to pass through the bore 23 into the space 24 or 25 and thence through the adjacent bore 23 to the discharge chamber 21. This action will become apparent upon reference to the tooth and tooth space at 18 in Figure 3 wherein the tooth space is connected by the bore 23 with the opposite tooth space which is in communication with the notch 24. The notch or space 24 is of sufficient length to be in communication with the next tooth space and thence through the bore 23 associated therewith with the discharge chamber 21. As the gear 16 continues to rotate the tooth space opposite the one at 18 moves out of fluid communication with the notch 24 and hence no leakage from the discharge port to the inlet port takes place.

Thus, it will be seen that the construction of Figure 3 provides for a fully hydraulically balanced gear pump or motor while simultaneously providing for the release of the entrapped fluid at the point of mesh with the gears. Also, it will be seen that the fluid relieved from the tooth spaces is directed to the discharge port and thus enhances the capacity and efficiency of the device.

It will be apparent, as in the case of the embodiment of Figures 1 and 2, that the practice of this invention according to the embodiment of Figure 3 is not limited to any particular tooth contour but may be employed in connection with any fluid operable pump or motor which operates on the same principle as the one illustrated in Figure 3.

Accordingly, it will be understood that it is desired to comprehend such modifications of structure and arrangement as may be considered to come within the scope of the appended claims and the invention.

Having thus fully described my invention, what I claim as new and desire to secure by Letters Patent, is:

1. In combination in a gear pump, a casing having an inlet chamber and an outlet chamber, a pair of meshing gears rotatably mounted in said casing, each of said gears comprising an even number of teeth and intervening tooth spaces, a channel hydraulically connecting each of said tooth spaces with the tooth space directly opposite, and means comprising a passage in the wall of said casing for effecting fluid communication between the channels connected with the tooth spaces of each gear which are engaged by a tooth on the other gear with the next adjacent of said channels which opens into said outlet chamber.

2. In a pump, a casing, a pair of intermeshing gears journaled in said casing, said gears defining with said casing, inlet and outlet chambers, each gear having the tips of its teeth in sliding engagement with the casing wall for more than 180° of rotation, separate axially-spaced bores connecting the root space between each tooth of one gear with the diametrically opposite root space thereof, and channel means in the casing wall in continuous communication with one of said chambers and positioned to successively communicate with one end of each of said bores during the time the other end thereof is closed by an intermeshing tooth of the other gear.

3. In a pump, a casing, a pair of intermeshing gears journaled in said casing to form with said casing, intake and outlet chambers, each gear having the tip of its teeth in contact with the casing walls throughout substantially 180° of its pitch circle, each gear having separate axially-spaced passageways connecting oppositely disposed pairs of root sections between teeth, there being notches in the casing wall substantially greater in circumferential extent than the pitch of said gears and located to successively connect one end of each passageway with the next adjacent of said passageways as the other end of the first mentioned said passageway is closed by a tooth of the other gear.

4. In a pump, a casing having a pair of intermeshing gears journaled therewithin on parallel axes defining a plane, said gears forming with said casing, intake and exhaust chambers having inlet and outlet connections, respectively, each gear having passageways connecting opposite pairs of root sections between teeth, respectively, each passageway being separate from the others, and channels in the wall of said casing on the inlet side of said plane, each of said passageways as it is instantaneously closed by the intermeshing tooth of the other gear, being connected through one of said channels with the passageway next adjacent.

WALTER ERNST.

REFERENCES CITED

The following references are of record in the file of this patent:

UNITED STATES PATENTS

| Number | Name | Date |
|---|---|---|
| 2,029,742 | Sieverts | Feb. 4, 1936 |

FOREIGN PATENTS

| Number | Country | Date |
|---|---|---|
| 133,893 | Switzerland | Nov. 16, 1929 |
| 705,498 | Germany | Apr. 30, 1941 |
| 713,285 | France | Aug. 11, 1931 |
| 795,534 | France | Jan. 8, 1936 |